Figure 1:
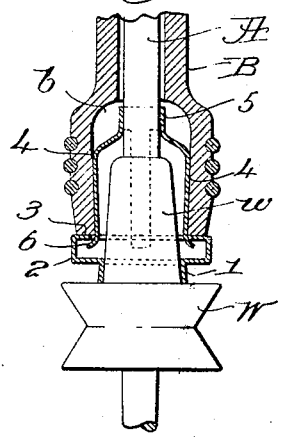

No. 773,554. PATENTED NOV. 1, 1904.
J. C. EDWARDS.
BOBBIN CLUTCHING MEANS FOR ROTATABLE SPINDLES.
APPLICATION FILED JULY 23, 1904.
NO MODEL.

Witnesses,
Edward G. Allen.
T. Wm. Lutton.

Inventor,
John C. Edwards,
by Crosby Gregory.
Attys.

No. 773,554.                                              Patented November 1, 1904.

UNITED STATES PATENT OFFICE.

JOHN C. EDWARDS, OF BROOKLINE, MASSACHUSETTS, ASSIGNOR TO SAWYER SPINDLE COMPANY, A CORPORATION OF MAINE.

BOBBIN-CLUTCHING MEANS FOR ROTATABLE SPINDLES.

SPECIFICATION forming part of Letters Patent No. 773,554, dated November 1, 1904.

Application filed July 23, 1904. Serial No. 217,837. (No model.)

*To all whom it may concern:*

Be it known that I, JOHN C. EDWARDS, a citizen of the United States, and a resident of Brookline, county of Norfolk, State of Massachusetts, have invented an Improvement in Bobbin-Clutching Means for Rotatable Spindles, of which the following description, in connection with the accompanying drawings, is a specification, like characters on the drawings representing like parts.

This invention has for its object the production of novel means for retaining in position and driving a yarn-receiver or bobbin when placed upon a rotating spindle, the invention being applicable to rotatable spinning, twister, or other similar spindles.

The clutching means comprehends a plurality of elongated resilient arms arranged around the spindle and extended longitudinally thereof and fixedly attached at one end to the spindle to be rotated bodily in unison therewith, means being provided to coöperate loosely with the free ends of said arms and limit their radial movement while permitting longitudinal movement of the arms when they are bowed or curved outward by the action of centrifugal force.

By the construction embodied in this invention I provide a laterally-expansible clutch device which is forced by centrifugal action into driving engagement with the walls of a chamber formed in the yarn-receiver or bobbin, the flexibility and resilience of the clutch device enabling it to readily conform approximately to the shape or contour of the chamber-walls. The clutching-arms are preferably stamped or cut out of spring or resilient sheet metal and integrally connected at one end by a portion of the blank, which is subsequently bent into a collar to tightly fit the spindle, the arms then surrounding the latter and extending longitudinally thereof. Said arms are longitudinally and outwardly convexed to the general shape of the interior of the bobbin-chamber, and when the spindle is at rest the resiliency of the arms contracts them. When the spindle is running, however, the centrifugal force acts against such contractile action of the arms and bows or curves them outward, so as to engage and drive a bobbin when brought into coöperative relation therewith. The free ends of the arms are prevented by suitable means from flying outward or upward to an improper degree while permitting the slight longitudinal or creeping movement of the arms caused by the centrifugally-induced bowing or curving.

The various novel features of my invention will be fully described in the subjoined specification and particularly pointed out in the following claims.

Figure 2:
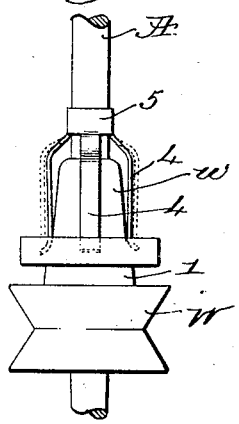
Figure 3:
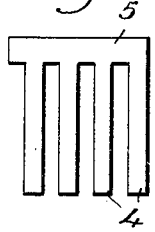
Figure 4:
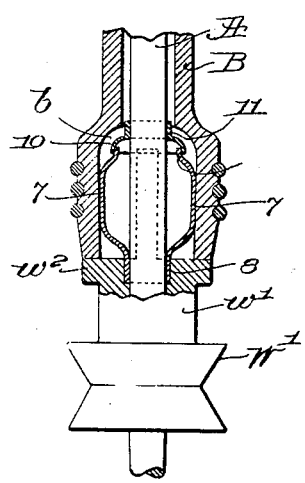
Figure 5:
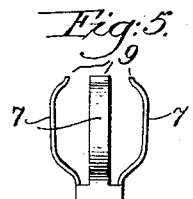
Figure 6:
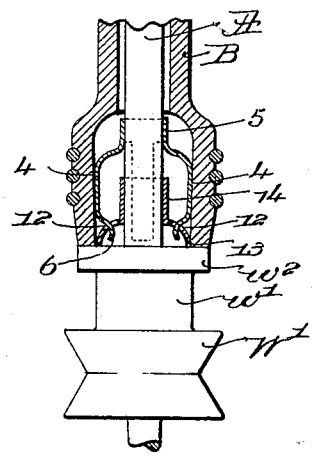

Figure 1 is a view in side elevation of a portion of a rotatable spindle of well-known character with one embodiment of my present invention applied thereto and shown in section, as is also the lower portion of a yarn-receiver or bobbin in operative position. Fig. 2 is a side elevation of the spindle and bobbin-clutching means shown in Fig. 1, the bobbin being omitted. Fig. 3 is a plan view of the blank from which the clutching members are formed. Fig. 4 is a view, partly in section and elevation, of a different form of bobbin-clutch applied to a rotatable spindle. Fig. 5 is a separate view, in side elevation, of the clutching means detached illustrated in Fig. 4; and Fig. 6 is a side elevation of a spindle of the character shown in Fig. 4 with a modified form of clutch device applied thereto.

My invention is for convenience herein illustrated in connection with a spinning-spindle of the sleeve-whirl type, and, as will appear hereinafter, it is applicable to spindles now in use or to new spindles in process of manufacture, as may be most convenient or desirable.

In Figs. 1 and 2 the spindle A and its whirl W, rigidly connected therewith by a depending sleeve *w*, are and may be of well-known construction, the sleeve having applied to it a bobbin-rest to vertically support the yarn-receiver or bobbin B. This bobbin-rest is shown as comprising an annular collar 1, having its upper end turned outward and upward, as at 2, and then overturned to form an annular inturned flange 3, the collar being forced down upon the sleeve *w* and held firmly thereon by frictional engagement by pinning or otherwise. The lower end of the bobbin when applied to the spindle rests upon and is vertically supported by the bobbin-rest, as shown in Fig. 1. The clutching means is shown as comprising a plurality of flexible, resilient, and elongated metallic arms 4, which in practice are cut or stamped out of a piece of sheet metal, as shown in Fig. 3, the several arms being connected at one end by a transverse portion 5 of the metal. The portion 5 is rolled over to form a collar, as shown in Figs. 1 and 2, which is forced upon the spindle to a point adjacent the upper end of the whirl-sleeve $w$, the arms 4 depending longitudinally of the spindle and being symmetrically arranged around the sleeve. Before they are so applied the arms are longitudinally and outwardly bent or convexed, as shown in Figs. 1 and 2. to a shape somewhat approaching the contour of the bobbin-chamber $b$, the normal curvature of the arms when the spindle is at rest being shown in dotted lines. The lower free ends of the arms are outturned at 6 and project outward beneath the flange 3 of the bobbin-rest, whereby they are loosely held thereby and prevented from undue outward movement. They are permitted a limited longitudinal movement in order to permit the additional outward curvature imparted to the arms by the action of centrifugal force when the spindle is rotating at speed sufficient to overcome the normal contractile action due to the resiliency of the arms.

When a bobbin is placed on the spindle, the clutching-arms are momentarily pressed inward as the lower end or mouth of the bobbin-chamber slides down over them, and when the bobbin is seated on the bobbin-rest the centrifugal force immediately bows out said arms against the walls of the chamber into driving engagement therewith. Owing to the flexibility of the arms, they closely approach the contour of the chamber-walls, the latter being preferably slightly flared upwardly, as shown in Fig. 1, to obviate any lifting tendency of the bobbin, the greater lateral expansion of the arms occurring near their upper ends.

In Figs. 4 and 5 I have shown a different arrangement of clutching means applied to a spindle A,' having its whirl W' secured thereto by a sleeve $w'$, provided at its upper end with a flat enlarged annular head $w^2$, which forms a bobbin-rest. The clutching-arms 7 are upturned in this instance from the collar 8 integral therewith, the collar being shown as firmly held between the spindle and the head $w^2$, Fig. 4, and the arms are bent or convexed outwardly and longitudinally to enter and coöperate with the bobbin-chamber $b$, as before. In order to prevent the upper free ends of the arms from flying out unduly when the spindle is running free, the ends of the arms are made straight at 9 and enter loosely within the depending flange 10 of an inverted cup-like collar 11, secured to the spindle. The clutching action with the bobbin is effected as has been previously described.

In Fig. 6 the form of spindle and the whirl are the same as in Fig. 4; but the clutching device is constructed as shown in Figs. 1 and 2, the arms 4 depending from the collar 5, fixedly secured to the spindle. The lower free ends of the arms enter slots 12 in the bellmouth or flared lower end 13 of a collar 14, secured to the spindle just above the head or bobbin-rest $w^2$.

In Fig. 4 the clutching device must be applied to the spindle in process of construction; but in Fig. 6 the clutching device can be applied to the same type of spindle at any time.

The resiliency of the clutching-arms in any of the several forms shown enables the bobbin to be applied or removed with great ease and without requiring force in either case.

The clutching means is light in weight, readily and cheaply constructed, and easily applied and operates efficiently for the purpose designed.

While I have shown four clutching-arms, it will be manifest that a larger or smaller number may be used, as desired, it being desirable, however, to arrange them symmetrically in order that the spindle may be evenly balanced.

Having fully described my invention, what I claim as new, and desire to secure by Letters Patent, is—

1. The combination with a rotatable spindle having an attached bobbin-rest, of bobbin-clutching means comprising a plurality of resilient arms arranged around and connected at one end with the spindle and extended longitudinally thereof above the bobbin-rest, said arms being adapted to practically conform to the contour of a bobbin-chamber when moved outward by or through centrifugal action, to thereby engage and cause rotation of the bobbin with the spindle, and means to coöperate loosely with the free ends of the arms to limit their radial movement.

2. The combination with a rotatable spindle having an attached bobbin-rest, of bobbin-clutching means comprising a plurality of resilient arms integrally connected at one end and grouped around the spindle and fixedly attached thereto at their connected ends, the arms extending longitudinally of the spindle above the bobbin-rest and being outwardly curved to enter and coöperate with the walls of a bobbin-chamber when said arms are moved outward by centrifugal action, and means to coöperate with the free ends of the arms and limit their radial movement.

3. The combination with a rotatable spindle having an attached bobbin-rest, of flexible clutching members above and separate from the bobbin-rest, arranged around and connected at one end with the spindle and extended longitudinally thereof, and means to loosely coöperate with the free ends of and limit movement of said members when bowed outward by or through centrifugal action.

4. The combination with a rotatable spindle having an attached whirl and a bobbin-rest, of longitudinally-extended, flexible bobbin-clutching members fixedly connected at one end with the spindle independently of the whirl, to rotate with the spindle and be moved outward by centrifugal action due to rotation of the spindle, and means to restrain the free ends of the clutching members from undue movement when the spindle is running empty.

5. The combination with a rotatable spindle having an attached bobbin-rest, of a plurality of flexible, elongated and outwardly-curved bobbin-clutching members arranged axially around the spindle above the bobbin-rest, means to fixedly connect said members at one end with the spindle to rotate bodily therewith, and a slip connection between the other free ends of said members and the spindle and fixedly connected with the latter, whereby outward movement and a change in curvature of the clutching members between their ends may be effected by or through centrifugal action.

6. A rotatable spindle having a bobbin-rest, combined with bobbin-clutching means comprising an annular neck to receive and fixedly engage the spindle and having a plurality of integral, longitudinally and outwardly convexed resilient arms extended in the direction of the length of the spindle, and retaining means for the free ends of the arms when the latter are moved outward by or through centrifugal action.

7. A rotatable spindle having a bobbin-rest, combined with bobbin-clutching means comprising a series of longitudinally and outwardly curved resilient arms connected fixedly at one end with and extended in the direction of the length of the spindle and adapted to conform to the shape of a bobbin-chamber when moved outward by or through centrifugal action, and means loosely coöperating with the free ends of said arms to limit their outward movement.

8. The combination with a rotatable spindle having an attached whirl, of laterally-expansible and centrifugally-acting bobbin-clutching means comprising a plurality of integral, longitudinally and outwardly convexed resilient arms arranged around and extended longitudinally of the spindle, a fixed connection between the spindle and one end of said arms, and means rotatable with the spindle to coöperate loosely with the other ends of the arms and serving also as a bobbin-rest.

9. The combination with a rotatable spindle having an attached whirl, of laterally-expansible and centrifugally-acting bobbin-clutching means comprising a plurality of longitudinally and outwardly convexed, depending resilient arms connected at their upper ends and secured thereat to the spindle, said arms being symmetrically arranged around the latter, and means rotatable with the spindle to loosely coöperate with the free lower ends of the arms and limit radial and longitudinal movement thereof.

10. The combination with a rotatable spindle having an attached whirl, of laterally-expansible and centrifugally-acting bobbin-clutching means comprising a plurality of longitudinally and outwardly convexed, depending resilient arms connected at their upper ends and secured thereat to the spindle, said arms being symmetrically arranged around the latter, the free ends of said arms being outturned, and a bobbin-rest rotatable with the spindle and having an inturned flange to overhang the outturned ends of the arms and limit radial and longitudinal movement thereof.

11. The combination with a rotatable spindle having an attached sleeve provided with a whirl, of a bobbin-rest mounted on said sleeve and having an inturned annular flange, and laterally-expansible bobbin-clutching means comprising an annular collar to tightly fit the spindle above the sleeve, and a plurality of longitudinally and outwardly convexed, resilient depending arms integral with the collar and arranged symmetrically around the spindle, the lower, free ends of said arms being bent out and projecting beneath the flange of the bobbin-rest.

12. Bobbin-clutching means for rotatable spindles, comprising an annular metallic collar having a plurality of elongated and integral resilient arms longitudinally and outwardly convexed, said collar being adapted to be forced onto a spindle, and a retaining device for the free ends of the arms, also adapted to be fixedly mounted on a spindle.

In testimony whereof I have signed my name to this specification in the presence of two subscribing witnesses.

JOHN C. EDWARDS.

Witnesses:
ELIZABETH R. MORRISON,
NATHAN HEARD.